Oct. 26, 1965  R. MONAGHAN  3,214,587
RADIOACTIVITY WELL LOGGING APPARATUS UTILIZING
A SCINTILLATION DETECTOR
Filed May 12, 1961  3 Sheets-Sheet 1

INVENTOR.
RALPH MONAGHAN
BY E. F. Bard
ATTORNEY

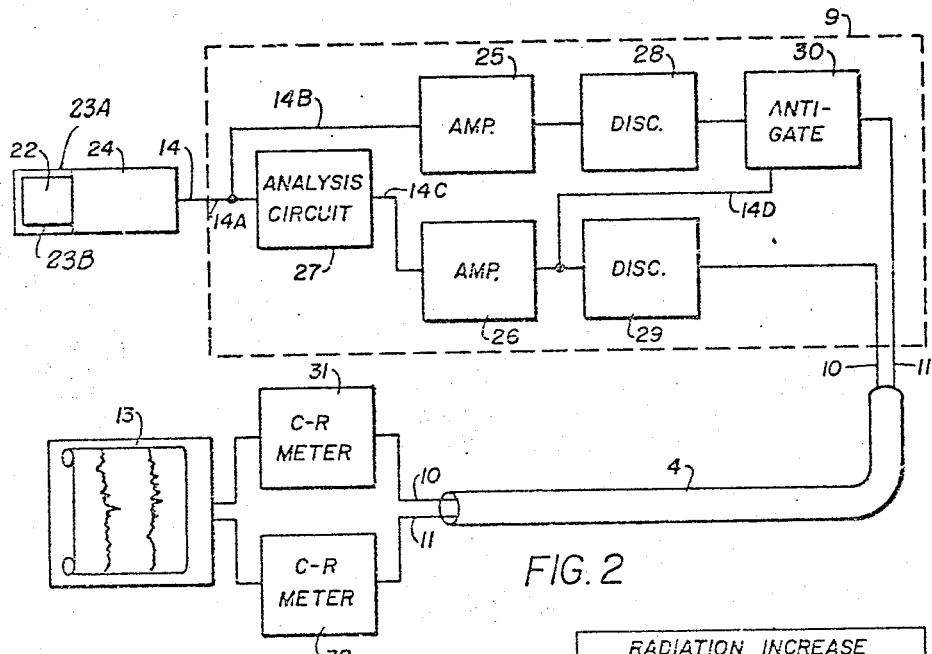
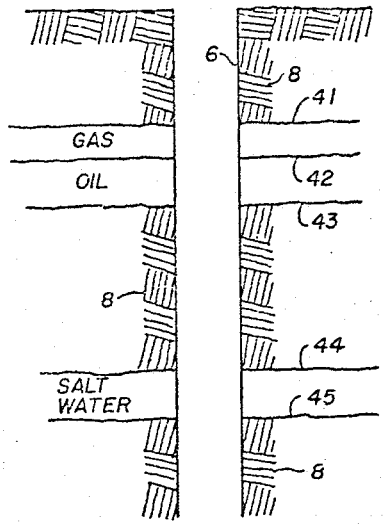
FIG. 3B
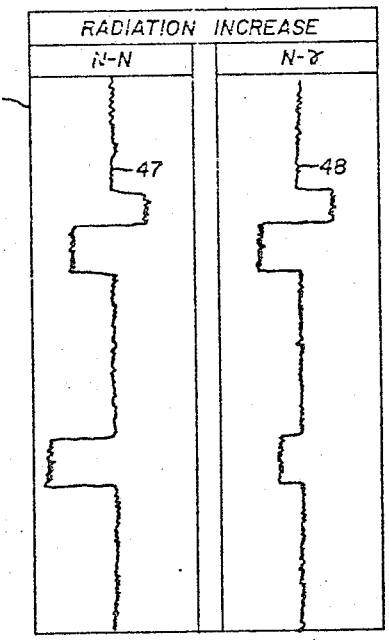
FIG. 3A
INVENTOR.
RALPH MONAGHAN
BY E. F. Bard
ATTORNEY

United States Patent Office 3,214,587
Patented Oct. 26, 1965

3,214,587
RADIOACTIVITY WELL LOGGING APPARATUS UTILIZING A SCINTILLATION DETECTOR
Ralph Monaghan, Tulsa, Okla., assignor, by mesne assignments, to Dresser Industries, Inc., Dallas, Tex., a corporation of Delaware
Filed May 12, 1961, Ser. No. 109,686
9 Claims. (Cl. 250—71.5)

This invention relates to the art of well logging by means of irradiation of subsurface substances traversed by a borehole, and more particularly relates to methods and apparatus for making simultaneous gamma ray and neutron logs of such substances with a single detector.

It is well known that oil, gas, and other related natural substances generally included within the generic term "petroleum" are usually found in and between various subsurface earth and rock formations. It is also well known that recovery of these substances is generally achieved by drilling a borehole in the earth and into, or through, the formations suspected to contain petroleum. Of course, it is obviously difficult to determine the character of the various formations of interest, insofar as their oil-bearing possibilities are concerned, since the formations often lie thousands of feet below the surface of the earth, and since access thereto can only be had through a borehole which usually measures but a few inches in diameter.

Various methods and apparatus for vertically surveying or "logging" the borehole have been devised, from time to time, for the purpose of determining one or more characteristics of the traversed substances such as electrical resistivity, density, etc. Based on the data obtained by one or more of these measurements, conclusions are then more or less tentatively reached by means of empirical formulae, analogous reasoning, and sometimes merely "educated guessing," as to the existence of oil (or other petroleum substances) in profitable quantities in particular formations. Although no commercially feasible well logging techniques currently exist which provide a direct indication of the presence of oil and gas, careful measurements of certain characteristics of a particular formation can often eliminate the formation from further consideration. For example, it is now well known that petroleum does not exist in these formations in the form of streams or "pools," as the term is applied to subsurface water, notwithstanding the common usage of the term "pool" in the oil industry. To the contrary, these much sought after substances exist in a rather finely divided state within the small pockets or cavities created by the close association of the particles of material composing the formation. Obviously, the maximum amount of fluid, which may be contained in a given volume of a particular formation, depends directly upon the porosity of the formation. No earth substance, even so-called "solid rock," is actually solid. However, formations composed of materials such as granite are obviously unlikely petroleum prospects, whereas sedimentary formations such as those composed of limestone or sandstone usually warrant attention. Thus, a measurement of the porosity of the substances traversed by a borehole is usually one of the prime objectives in logging operations.

The various types of radioactivity logging techniques now in use were developed in response to a need for more conclusive information concerning these relatively inaccessible subsurface earth formations. The first radioactivity log commercially offered consisted essentially of a measurement of the amount of gamma radiation emitted naturally by the substances penetrated by the borehole. Since it is well known that shales are usually more radioactive a natural gamma ray log is often a useful measurement. Another well known radioactivity borehole measurement involves logging the borehole with apparatus comprising a source and detector of gamma rays. The source-emitted gamma rays penetrate and "scatter" in the surrounding formations, as the apparatus is passed through the borehole, and the detector senses a representative number of the scattered rays which return to the interior of the borehole. The variation in the number of scattered gamma rays detected at various levels is generally informative of variations in the density of the substances at such levels. An indication of the density of the aggregated substances comprising a formation is generally assumed by log analysts to provide a relative indication of the porosity, of the formation, although this is not always true.

Of course, even in those cases where a density measurement does provide a truthful porosity indication, it furnishes no indication of the nature of the fluid which may be reposing in a formation. For this reason a well logging measurement was devised wherein apparatus consisting, essentially, of a source of neutrons and a neutron detector, is passed through the borehole for the purpose of determining the relative number of scattered neutrons which traverse the various formations without being captured. The measurement, depending upon exactly how it is performed, is actually a measurement of slowing or moderating effect which the penetrated substances exercise upon the source-emitted neutrons. In addition, a measurement of the number and energy of the gamma rays which this neutron bombardment produces is often made in conjunction with the neutron measurement, as hereinafter described in more detail. Insofar as the scattered neutron measurement is concerned, the particular significance of the moderating effect exercised by the bombarded formation substances lies in the fact that so-called "fast" (above 100 kev. energy) neutrons easily penetrate substances composed substantially of the heavier elements, but that they tend to be slowed by substances composed substantially of the lighter elements. It is well-known that hydrogen, which is the lightest of all of the elements, is the most effective neutron moderator. Therefore, since hydrogen is a major constituent of practically all naturally-occurring fluids, a sharp decrease in the number of scattered neutrons detected at a particular well level furnishes a very good indication of the presence of fluid at that depth. However, a scattered neutron log, in and of itself, cannot provide a conclusive indication of the identity of the fluid since water and oil contain about the same percentage of hydrogen. Thus, the logging analyst looks to a corelative measurement of the "prompt" gamma radiation produced by the neutron bombardment for an indication of the character of the fluid so encountered.

In brief, colliding neutrons interact with nuclei of various materials either by "scattering" or by "capture." In the case of scattering the neutron ricochets off the struck nucleus, and the only result is a change in the direction of the neutron and a transfer of a part of its kinetic energy to the nucleus. No radiation results from this type of interaction since there occurs no transfer of energy from the neutron to the nucleus. In the case of capture, however, the mass-energy of the resultant nucleus is in excess of its binding energy, and this excess is usually immediately given off in the form of gamma rays. It has been determined that the energy of these so-called "prompt" or "resulting" gamma rays is functionally related to the character of the struck nucleus which emits them, and therefore in some types of neutron well logging techniques a measurement of this energy is used as an indication of the identity of the elements composing the substances being irradiated by the neutrons. The type of interaction occurring as a result of neutron bombardment is always difficult to identify. However, it has been learned that the type of reaction produced depends in large part upon the energies of both the neutron and the bombarded nucleus and upon their relative masses. If a hydrogen atom is involved in the interaction, the neutron may lose as much as 100% of its energy, since a hydrogen atom has only one proton, and since a proton and a neutron have approximately the same mass. The neutron is then said to be thermalized, and thereafter may be readily captured by a nucleus. Most neutrons require more than one collision before being captured since it has been determined that the average neutron will lose only about 67% of its energy in a collision with a hydrogen nucleus. However, it is obvious that if a hydrogenous substance is irradiated with neutrons a substantial number will be captured after only a relatively few collisions, and a substantial number of the neutrons escaping capture will be very much slowed before returning to the borehole and to the neutron detector. On the other hand, if the irradiated substance is composed largely of heavier atoms such as carbon or oxygen, the average neutron will lose relatively little of its energy in each collision, and therefore many more collisions will be required before the average neutron is captured, or is slowed to what is termed "thermal" energy. Insofar as their respective energies are concerned, neutrons are somewhat arbitrarily classified in the art as "fast" (having energies greater than about 100 electron volts), "epithermal" (having energies of about 0.25 to 100 electron volts), and "thermal" (having energies less than about 0.25 electron volt).

The nuclear reaction hereinbefore referred to as "scattering" is actually a generic term covering two separate and distinct reactions known as "elastic scattering" and "inelastic scattering." In addition to these reactions, and to the reaction hereinbefore referred to as "capture," there are many other types of reactions possible in the collision of a neutron and a nucleus. Generally speaking, only one of all possible types of reactions will occur during a particular interaction or collision of a particular neutron with a particular nucleus, and where as any of this variety of reactions may possibly occur, their probability of occurrence differs greatly depending upon the speed of the neutron and the type of nucleus struck. The probability of a particular interaction, involving a nucleus of many different elements, has been determined for neutrons of a wide range of energies. This probability, referred to as the "reaction cross section," is expressed in units of $10^{-24}$ centimeters$^2$ (called "barns"). Although the expression is stated in terms of areal measurement, the number of barns computed for a particular reaction cross section does not necessarily equal the actual physical areal cross section of the particular nucleus involved. The total probability, of any interaction with a nucleus of a particular element, is referred to as the "total cross section," and the cross section for a particular interaction is referred to as the "capture cross section," the "elastic scattering cross section," and so forth, as the case may be. As hereinbefore stated, the velocity of the bombarding neutron is determinate of the amount of cross section for almost any type of interaction, and this is generally critical for capture cross sections of various elements. If a source of neutrons of a pre-determined energy is used in the logging operation, the number of neutrons passing through the surrounding substances without being captured is indicative of the character of the elements composing the traversed substances. Thus it is that the moderating effect of hydrogen upon a neutron cloud has become the basis for a great many very useful well logging measurements.

When a logging measurement is made of the prompt gamma rays resulting from neutron bombardment, the log is commonly termed a "neutron-gamma ray log." On the other hand, when a logging measurement is made of the moderating effect of the bombarded substance upon the neutrons, the log is referred to as a "neutron-neutron log." It is obvious that if both types of logs are obtained for a borehole the two measurements would supplement each other, and the combined measurement would be very useful. However, no commercially practical apparatus has heretofore been available which will distinguish between, as well as detect, neutrons and gamma rays. Therefore, when both measurements were desired, either the borehole was logged with apparatus employing both a neutron detector and a gamma ray detector, or two separate borehole trips were undertaken (one for each type of measurement). Unfortunately, due to variations in the position of the instrument in the borehole at various depths, variations in logging speed, and dissimilarities in the nature of the substances on opposite sides of the borehole at the same level, no two borehole trips can ever be expected to provide measurements of exactly the same environment. Even when apparatus employing both a gamma ray detector and a neutron detector was used, the two measurements, though co-relative with respect to lateral borehole position, were unrelated with respect to depth. This was due to the fact that, even when a common neutron source was employed, the ideal source-to-detector spacing for neutron-neutron logging is substantially different from the ideal source-to-detector spacing employed for neutron-gamma ray logging. Even when both spacings are the same, limitations of space require the two detectors to be positioned on opposite sides of the source. Moreover, such a logging instrument is excessively long and heavy, and therefore is hard to handle. The two detectors require more complex circuitry, and when malfunctions occur, they unfortunately do not affect both detectors in the same manner and to the same extent.

Among the various types of radiation detectors now in common use is the so-called "scintillation counter." Essentially, this device consists of a phosphor and a photomultiplier tube, the two components being optically coupled. The phosphor is a body (usually a crystal) of substance which reacts to incident radiation by producing a discrete light flash, or pulse, in response to each individual radiation (neutron, proton, photon, etc.). The photomultiplier tube is designed to produce, when energized, a pulse of electric current each time its photo-sensitive cathode "sees" one of the light pulses emitted by the phosphor. The brilliance of each light pulse is proportional to the amount of energy dissipated in the phosphor as a result of the individual incident radiation creating the light pulse. Since the amplitude of each electric pulse is caused (by the design of the tube) to be proportional to the brilliance of the light pulse, the amplitude of the electric pulses furnishes a direct indication of the energy of the incident radiations. Of course, when two or more incident radiations strike the phosphor simultaneously, only one electric pulse will be produced by the tube. The amplitude of the electrical pulse, in such a case, will be proportional to the sum of the total energy so dissipated as a result of the simultaneously incident radiations. However, the fact that some of the electrical pulses represent more than their intended number of radiations is not a serious deficiency, since a radiation detector is expected to merely sample the total radiation entering the borehole, and the number of radiations simultaneously striking the phosphor is a very small fraction of the total number incident thereon.

Originally, the various measurements made with apparatus employing scintillation counters for radiation detectors consisted in counting the number of rays sensed during a specified time interval. However, the fact that the amplitude of the tube output pulses is proportional to the energy dissipated in the phosphor as a result of the incident radiations which produce the output pulses, affords a method of distinguishing on an energy basis between classes of radiation. For example, if the output of the tube is passed to a discriminator which has its trigger level set to eliminate pulses below a certain level of amplitude, classes of radiation such as the natural gamma radiation from the formations can be eliminated from a logging measurement of scattered gamma radiation.

There are, of course, a variety of substances which are capable of producing scintillations (discrete light pulses) when struck by radiations. However, these phosphor materials respond differently to similar types of radiation, and therefore they differ in usefulness under changing circumstances. For example, organic phosphors such as stilbene and anthracene crystals are efficiently sensitive only to fast neutrons. On the other hand, phosphors composed of sodium iodide, potassium iodide, or potassium bromide, while highly sensitive to gamma radiation, have a relatively low sensitivity to thermal neutrons and almost no sensitivity to epithermal and fast neutrons. Phosphors composed of lithium iodide crystals are highly sensitive to thermal and epithermal neutron radiation. Unfortunately, their usefulness in scintillation counters employed in neutron-neutron logging equipment is limited by the fact that they are also highly sensitive to gamma radiation. Thus, lithium iodide crystals have heretofore been used as phosphors generally when only one type of radiation was expected to be encountered, or for neutron-neutron logging when co-existing gamma radiation could be largely eliminated by means of a discriminator.

These disadvantages of the prior art are overcome with the present invention, and novel methods and apparatus are provided for simultaneously making both an independent neutron-neutron log and an independent neutron-gamma ray log, of the same borehole, in a manner such that both logs are corelative with respect to time, borehole depth and position, and anomalies in circuit and detector component performance. Thus, all logging problems heretofore existing with respect to corelation of neutron-neutron and neutron-gamma ray measurements are eliminated, and a greater degree of accuracy and reliability is provided by the present invention.

The advantages of the present invention are preferably attained by employing a logging instrument employing a single radiation detector and a single source of neutrons. In such a logging instrument the neutron source may be either a so-called "natural neutron source" such as a capsuled radium-beryllium or polonium-beryllium source, or it may be a so-called "artificial source" such as an ion-beam accelerator of the type employing the well-known deuterium-tritium reaction. Under certain circumstances, one type of source may be preferred to the other. The single radiation detector is preferably a single scintillation counter employing a single phosphor which is efficiently responsive to both neutrons and gamma rays in a manner in which the responses to neutrons may be distinguished from the responses to gamma rays. A phosphor material found suitable for such purposes is thallium-activated lithium iodide, since, as hereinbefore mentioned, lithium iodide crystals are responsive to both neutrons and gammas, and since the shape of the light pulses occurring in lithium iodide crystals have been found to be functionally related to the mass of the particles of incident radiation creating such light pulses. Additionally, the electric pulses produced by the photo-electric tube in response to the scintillations of the lithium iodide phosphor are functionally related to the light pulses in shape as well as in amplitude. Thus, in those forms of the present invention hereinafter described, the logging apparatus includes circuitry for identifying and separating detector output pulses produced in response to neutrons, from pulses produced in response to gamma rays, on the basis of a distinction in output pulse shape or width. Once separated, the two groups of pulses are then preferably recorded simultaneously on a common recording strip in a manner such as to show their corelation.

Accordingly, it is an object of the present invention to provide novel methods and apparatus for distinguishably detecting neutrons and gamma rays.

Additionally, it is an object of the present invention to provide novel methods and apparatus for obtaining simultaneously and corelatively separate measurements of neutrons and gamma rays entering said borehole from the substances traversed by said borehole.

A further object of the present invention is to provide novel methods and apparatus for obtaining simultaneously and corelatively an independent neutron-neutron log, and an independent neutron-gamma ray log, of a borehole.

A specific object of the present invention is to provide a novel method of detecting gamma rays and neutrons, said method comprising the steps of irradiating the substances surrounding a borehole with a supply of neutrons, establishing at a point in said borehole light pulses representative of and having durations functionally related to radiations entering said borehole from said irradiated substances as a result of said neutron irradiation, establishing a first group of electrical pulses functionally related in number and width to said light pulses, separating said first group of electrical pulses into a second and a third group of electrical pulses, said second group having widths greater than a pre-determined width and said third group having widths less than said pre-determined width, and simultaneously and corelatively recording said second and said third groups of electrical pulses.

Another specific object of the present invention is to provide novel apparatus for logging a borehole, said apparatus comprising a source of neutrons, scintillation means emitting in response to incident radiation light pulses functionally related in width to said incident radiation, means for sensing said light pulses and providing in response thereto a first group of electrical pulses functionally related in number and width to the number and width of said light pulses, and means for receiving said first group of pulses and establishing a response thereto a second and third group of electrical pulses, said second group of pulses being functionally related in number and width substantially to the number and width of those of said first group of pulses having widths greater than a pre-selected width, and said third group of pulses being functionally related in number and width substantially to the number and width of those of said first group of pulses having widths less than said pre-selected width.

These and other objects and features of the present invention will be apparent from the following detailed description wherein reference is made to the figures in the accompanying drawings.

In the drawings:

FIGURE 2 is a diagrammatic representation of one form of radiation detector system useful in the present invention.

FIG. 3-A shows typical neutron-neutron and neutron-gamma logs corelatively displayed on a recording strip.

FIG. 3-B shows a pictorial view of the borehole yielding the measurements shown on the recording strip of FIG. 3-A.

Figure 1:
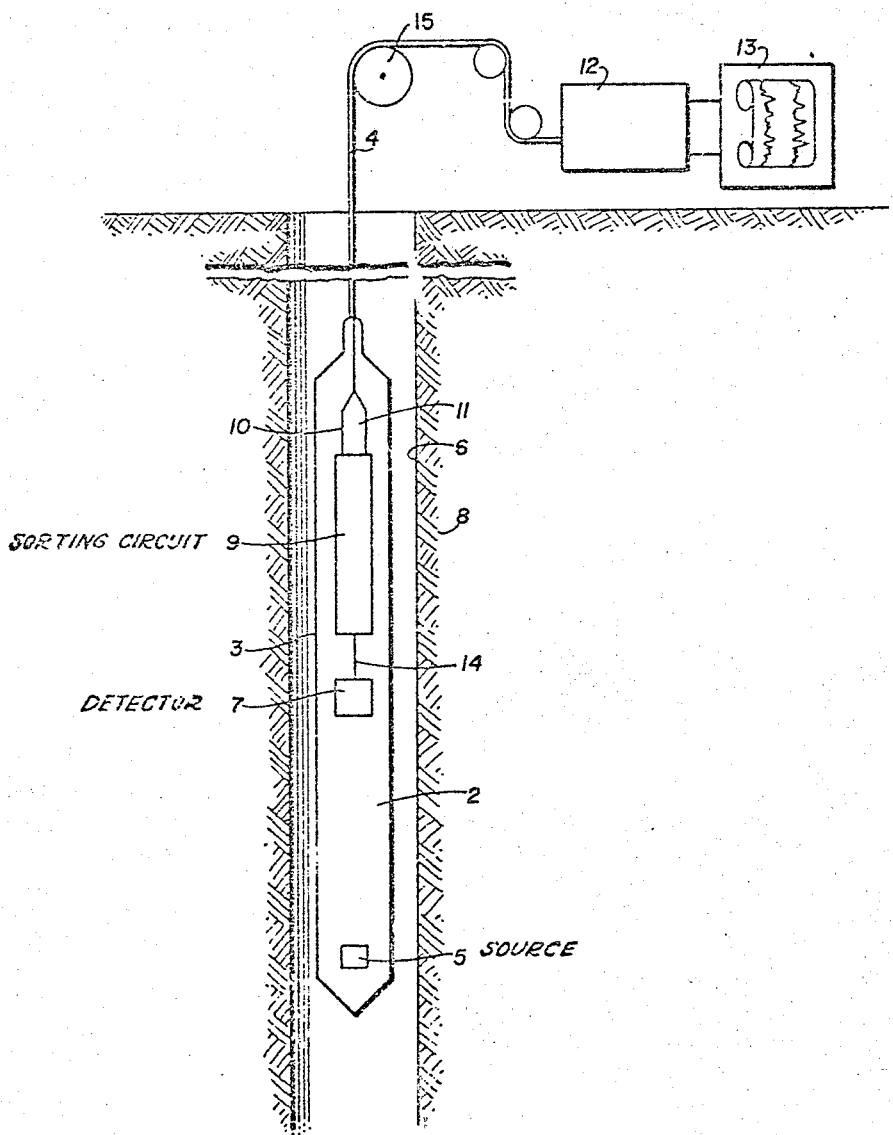
FIGURE 1 is a pictorial representation in cross section of a well logging instrument suspended in a borehole.
Figure 4:
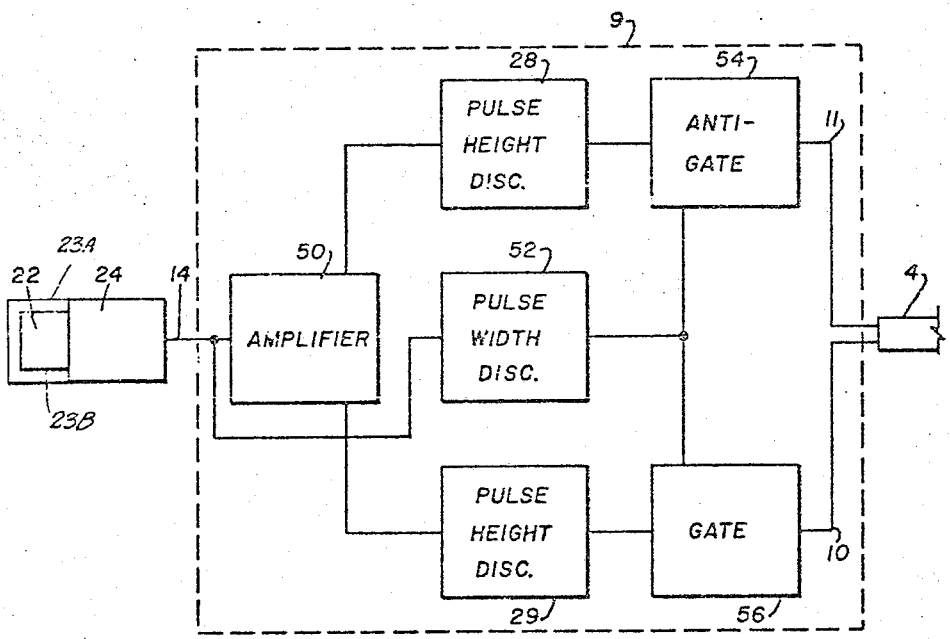

FIG. 4 depicts a typical analysis network that can be used in the FIG. 1 embodiment.

In that form of the present invention chosen for purposes of illustration in the drawings, FIGURE 1 shows a well logging instrument 2 suspended by a cable 4 in a borehole 6 for the purpose of investigating the character of the subsurface substances 8 penetrated by the borehole 6. The well logging instrument 2 may comprise an elongated pressure and temperature resistant housing 3 of the type generally utilized for subsurface exploration. As depicted in FIGURE 1, a neutron source 5 is disposed in the lower end of the housing 3, and a radiation detector 7 is disposed above the source 5 in the housing 3 in a manner such as to preferentially sense radiations entering the borehole 6 from the subsurface substances 8. In that form of the present invention depicted in FIGURE 1, the radiation detector 7 is preferably apparatus which responsively produces electrical pulses functionally related to the respective individual incident radiations. It is also preferable that the detector 7 be efficiently sensitive to both neutrons and gamma rays, and therefore, when the incident radiation is composed of both neutrons and gamma rays, it is necessary to distinguish between those pulses initiated in response to neutrons and those pulses initiated in response to gamma rays. In the present invention, the detector 7 provides electrical pulses having characteristics in shape which are functionally related to the respective individual incident radiations which initiate the pulses. Thus, the aggregation of pulses are passed in the form of a first electrical signal, through a first channel 14, to a sorting circuit 9 which is adapted to distinguish, on the basis of at least one pre-selected characteristic of pulse shape, between those first signal pulses initiated by neutrons and those first signal pulses initiated by gamma rays. The sorting circuit 9 produces at least two output signals in response to the first electrical signal. In that form of the present invention depicted in FIGURE 1, the first of these secondary signals is substantially composed of pulses functionally related to those first signal pulses initiated by neutrons, and is applied to the cable 4 via a second channel 10. The other secondary signal produced by the sorting circuit 9 is substantially composed of pulses functionally related to those detector 7 produced pulses functionally related to incident gamma rays, and is applied to the cable 4 via a third channel 11. It should be understood that the two secondary signals produced by the sorting circuit 9 are conducted to the surface of the earth by the cable 4 in a manner such that the pulses forming the two secondary signals do not become indistinguishably intermixed. At the earth's surface, the two secondary signals are passed to a recorder 13 via amplification and pulse counting equipment depicted in FIGURE 1 generally as surface equipment 12. The recorder 13 generally displays the recorder signals in corelation with an indication of the borehole depth at which the related radiations are sensed. This depth indication may be derived from the operation of a measuring wheel 15, from which the cable 4 is suspended and over which it is drawn by a means such as a winch (not depicted). The measuring wheel 15 may be suspended in any convenient manner, such as by a traveling block suspended from a derrick erected over the borehole.

As hereinbefore stated, the sorting circuit 9 is provided for the purpose of distinguishing, on a pre-selected basis, between detector 7 output pulses initiated by incident neutrons and detector 7 output pulses initiated by incident gamma rays. In the present invention, it is contemplated that the detector 7 will provide pulses having distinctive shape characteristics functionally related to the type of radiations initiating them, and that these shapes will furnish the means for making such a distinction. In other words, pulses attributable to incident neutrons will have at least one common shape characteristic, and pulses attributable to incident gamma rays will have at least one common shape characteristic. Furthermore, the particular characteristic of pulse shape used to identify neutron-produced pulses must be distinguishable from the particular characteristic of pulse shape used to identify gamma-produced pulses. In those cases where the majority of the incident gamma rays have energies within a range different from the energy range of the majority of the neutrons, the amplitude of the pulses may provide a basis for distinction. In cases where the energy ranges of the neutrons and gamma are substantially overlapping, and in cases where it is desirable to measure the energies of a sub-classification of the incident radiation (such as a measurement of low energy gamma rays with respect to high energy gamma rays) the pulse amplitude is not a desirable basis for distinguishing between incident neutrons and incident gamma rays. Thus, it is desirable that the radiation detector 7 be adapted to provide an output signal composed of electrical pulses having widths or lengths falling within one pre-eselected range of lengths, when initiated by incident neutrons, and having lengths falling within another different pre-selected range when initiated by gamma rays. Therefore, if suitable discriminators and other necessary circuitry are added to the apparatus depicted in FIGURE 1, the information provided by the first secondary signal in the second channel can be separated into first and second tertiary signals indicative, respectively, of neutrons incident upon the detector 7.

FIGURE 2 depicts in detail one desirable form of the radiation detector 7 appearing in FIGURE 1. The apparatus includes a phosphor 22 which may be a thallium-activated crystal composed of lithium iodide. In that form of the invention depicted in FIGURE 2, the phosphor 22 is disposed adjacent an energized photomultiplier tube 24 so that the scintillations produced in the phosphor 22 by incident radiations serve to initiate electrical pulses as hereinbefore mentioned. These pulses, which form the output signal of the photomultiplier tube 24 are then connected via the first channel 14 (see also FIGURE 1) to a pulse aralysis circuit 27 and to a first amplifier 25 included in sorting circuit 9. In FIGURE 1, the first channel 14 was shown as directly connecting the output of the radiation detector 7 to the sorting circuit 9. In FIGURE 2, the output signal of the photomultiplier tube 24 is shown performing the same function as the output signal of the detector 7, and the sorting circuit 9 is represented by a heavy dashed line enclosing the pulse analysis circuit 27, the first amplifier 25, and the other components and circuitry hereafter described in detail.

Within the sorting circuit 9, the first signal channel 14 branches into channel 14–A and channel 14–B. Thus, the signal received by the first amplifier 25 is identical in every respect, including time, with the signal received by the pulse analysis circuit 27. As hereinafter explained in detail the scintillations or light pulses produced in a phosphor 22 composed of lithium iodide by incident neutrons are inherently distinguishably different in shape from the shape of the light pulses produced therein by gamma rays. Since the length of an electrical pulse emitted by the photomultiplier tube 24 is related to the duration of its initiating light pulse, the neutron-initiated electrical pulses will be distinguishably different from the gamma-initiated electrical pulses. The pulse analysis circuit 27, therefore, functions to generate an output signal composed time-wise of pulses functionally related, preferably with respect to pulse shape and amplitude, to all pulses in the first channel 14 which have lengths greater than a pre-selected length. The pulse analysis circuit 27 output signal, as thus constituted, is applied via signal channel 14–C to a second amplifier 26. Any type of pulse analysis network capable of separating electrical pulses on the basis of a difference in shape or length, such as the circuit described by F. D. Brooks in Vol. 4, page 151, of Nuclear Instruments and Methods (1959), may be used as the pulse analysis circuit 27.

The output of the first amplifier 25, which includes both "long" and "short" pulses, is then applied to a first discriminator 28 which is adapted to apply selected and related pulses to an anti-gating circuit 30. The output of the second amplifier 26, which is composed of only the so-called "long" pulses, is passed to a second discriminator 29 and also, via channel 14–D, to control the anti-gating circiut 30 in a manner such that its output signal, in channel in the cable 4, is thereafter composed of only those pulses related to the so-called "short" pulses provided by the first amplifier 25. The output signal of the second discriminator 29, which is composed of pulses related to the "long" pulses provided by the second amplifier 26, is applied to channel 10 in the cable 4.

In order to provide for extra long pulses, the discriminator 28 may be provided with a conventional delay circuit to delay its output long enough to permit the output from the amplifier 26 to actuate the anti-gating circuit 30 before the arrival of pulses from the discriminator 28. At the surface, the signal which is composed of substantially only gamma-initiated pulses is passed through a first counting rate meter 32 to the recorder 13. The output of the second discriminator 29, which is composed of substantially only the neutron-initiated pulses, is passed to the recorder 13 via a second counting rate meter 31.

As hereinbefore stated, the scintillation material chosen for the phosphor 22 may be thallium-activated lithium iodide. Not only is such a phosphor efficiently sensitive to both neutrons and gamma rays, but the shape of a light pulse induced therein is directly related to the mass of the individual radiation which initiates the light pulse. The theory of any of the various nuclear reactions is complex, and thus the reasons for the foregoing phenomenon will not be discussed herein in detail. Suffice it to say, however, that the natural lithium composing the lithium iodide phosphor 22 contains a significant quantity (approximately 7.4%) of lithium–6 which has a relatively high absorption cross-section for both thermal and epithermal neutrons. The capture of the bombarding neutron produces in the crystal an alpha particle and a triton, and the passage of these charged particles through the phosphor 22 causes the momentary excitation and ionization of the molecules therein. The scintillation, which the photomultiplier tube 24 "sees," is the energy dissipated in the action of the dislodged electrons returning to electronic balance in the crystal. The intensity of the scintillation is proportional to the amount of this dissipated energy, and therefore the duration or length of the light pulse, or scintillation, is directly related to the extent of ionization created by the charged particles.

When the phosphor 22 is struck by a gamma ray, however, there occurs one or more of the reactions known as "pair production," "Compton scattering," and the "photoelectric effect," depending partly upon the energy of the bombarding gamma ray. In each reaction, an electron is released. In the case of any phosphor 22 composed of an iodide, the occurring reaction is frequently the photoelectric effect due to the relatively large photoelectric absorption cross-section possessed by iodine. Regardless of the nature of the reaction occurring, however, the bombarding gamma ray produces ionization in the phosphor 22, although the density of the ionization produced by the light electrons is substantially less than that produced by the heavier hereinbefore mentioned alpha and triton particles. Thus, the electrical pulses produced by the photomultiplier tube 24 will generally be distinguishably different in shape and length, depending upon whether the initiating radiation is a gamma ray or a neutron. The tendency of an efficient photomultiplier tube 24 to "smear" the pulse is not a significant factor for the purposes of the present invention. In addition, while it is possible for a pulse produced by a high energy gamma to have an amplitude such that the length of the pulse falls within the range of neutron pulse lengths, this is not a significant factor for most well logging measurements. It is the decay time, of the ionization created in the phosphor 22, which is determined by the mass of the exciting or initiating radiation. The rise time of the light pulse is apparently unrelated to the mass or type of radiation which produces or initiates the scintillation, and thus it is more precisely the shape of the light pulse, rather than the length per se, which affords the basis for identifying the incident radiations. In other words, it is the ratio of the length to the height which is indicative. The aforementioned Brooks circuit is especially useful for the purpose of the present invention since it is responsive to pulse shape, rather than merely to pulse width, and since an analysis circuit 27 of this type does not affect pulse amplitude. However, the advantages of the present invention are readily obtainable, for the most part, with the use of any type of pulse-width discriminator as the analysis circuit 27 if the network chosen does not undesirably affect pulse amplitude proportion.

FIGURE 4 depicts a typical analysis network which provides pulse "separation" on the basis of pulse width or length, rather than on shape. Represented therein is the phosphor 22, photomultiplier tube 24, and sorting circuit 9 as depicted in FIGURE 1. The internal details of the sorting circuit 9 differ from the circuitry hereinbefore discussed, however, in that the tube 24 output signals in channel 14 may be applied to a single amplifier 50 and to a pulse width discriminator 52 which may be set to respond to pulses having widths greater than a predetermined pulse width or length. The output pulses of the amplifier 50 are applied equally and simultaneously to a first pulse height discriminator 28, a second pulse height discriminator 29. The output pulses of the pulse width discriminator 52, which relate to the neutron-initiated pulses in channel 14, are applied simultaneously to an anti-gating circuit 54 and a gating circuit 56. Thus, the "long" pulses are removed from the output of the anti-gating circuit 54, and the "short" pulses are removed from the output of the gating circuit 56. The signals emitted by the anti-gating circuit 54 and the gating circuit 56 are respectively applied to channels 11 and 10, in the cable 4, for transmission and utilization as hereinbefore described.

There are other scintillation materials useful in the present invention. For example, although sodium iodide crystals are generally considered to be unsuited for neutron detection, there is a threshold type of neutron-proton reaction for sodium. Thus, if a sodium iodide crystal is used for the phosphor 22, a fast (greater than approximately 3.5 mev.) neutron measurement may thereby be obtained in corelation with the neutron-gamma ray heretofore mentioned. In addition, the phosphor 22 may consist of a crystal of sodium iodide, potassium iodide, potassium bromide, or other similarly functioning substance, if the crystal is surrounded or covered with a coating 23A of lithium or boron on all sides except the side adjacent the cathode of the photomultiplier tube 24. The bombarding neutron will thus create a neutron-alpha reaction in the lithium or boron coating, in the manner hereinbefore described for the lithium iodide phosphor 22, and the charged particles thereby emitted from the lithium or boron coating 23A may be expected to penetrate and cause the crystal to scintillate in the usual manner. In such a case, the phosphor 22 may be considered to be efficiently sensitive to thermal and epithermal neutrons, like the lithium iodide phosphor 22, as well as to gamma rays. Scintillation materials such as anthracene and stilbene are not unsuitable for some purposes of the present invention. The relatively poor gamma ray sensitivity of such materials, compared to the iodide materials hereinbefore mentioned, is chiefly due to the difference in density between the organic crystals and the other crystals. Thus, the low density of anthracene (which is only a little greater than the density of water) does not efficiently "stop" the higher energy gamma rays. However, in cases where space is not a limitation on utility, relatively large organic crystals such as anthracene and stilbene provide suitable phosphors 22 for the present invention.

In FIGURE 3–A, there is shown a typical neutron-neutron log 47 and neutron-gamma ray log 48 obtained by means of the present invention and corelatively displayed on a single recording strip 47. FIGURE 3–B shows a pictorial view of the borehole yielding the measurements shown on the recording strip 46, and for purposes of illustration is shown in the drawings opposite related displacements of logs 47 and 48. Thus, in FIGURE 3–B, the borehole traverses an upper formation, which is shown with boundaries 41 and 42, and a lower formation, which is shown with boundaries 44 and 45.

For purposes of simplification, it should be assumed that all other substances 8 traversed by the borehole consist entirely of some relatively non-porous material such as limestone. As was hereinbefore stated, both the neutron-neutron log 47 and the neutron-gamma ray log 48 are primarily used to indicate porosity. Thus, both logs 47 and 48 reveal the upper formation shown by boundaries 41 and 42, and 41 and 43. Moreover, both logs 47 and 48 show a substantially identical decrease between boundaries 42 and 43, since both measurements are similarly subject to the moderating effect of hydrogen. Thus, the shift to the left by both logs 47 and 48 is ample indication of the presence of a fluid bearing formation, and the primary value of corelatively making and displaying both measurements lies in the fact that one log serves as a valuable monitor or check for the other.

The gas cap, which is defined in FIGURE 3–B by boundaries 41 and 42, is depicted in FIGURE 3–A by a right-hand shift or displacement of both logs 47 and 48. Although the gas is hydrogenous, it is substantially less dense than oil and therefore does not exercise the same slowing effect on the neutron flux emitted by the source 5 depicted in FIGURE 1.

As hereinbefore stated, neither the neutron-neutron log 47 nor the neutron-gamma ray log 48 will separately provide a means for identifying the fluid contained in a formation shown to be porous. Thus, the shift to the left, of that part of log 47 opposite the lower formation shown in FIGURE 3–B by boundaries 44 and 45, merely serves to indicate the presence of a porous and fluid-bearing formation. Although the shift of log 47 at that level is greater than the shift of log 47 opposite boundaries 42 and 43, this difference may reasonably be interpreted as a difference in porosity if the measurement shown by log 47 were considered independently of log 48. In the same manner, the fact that the shift of log 48 is less opposite boundaries 44 and 45 than at boundaries 42 and 43 could be due to a difference in porosity if log 48 were considered independently. Even if the two measurements, though obtained independently, were considered together, the difference between the extent of shift to the left, of both logs at the level shown by boundaries 44 and 45, could be attributed to anomalies in the functioning of the logging instrument. With the present invention, however, the two logs are corelatively obtained and therefore such anomalies are not to be expected. Thus, the difference in the two measurements can only be attributed to the fact that the fluid in the lower formation has a higher neutron capture cross-section than does the fluid in the upper formation. Such a fluid can be expected in well logging to be salt water due to the high thermal neutron capture cross-section of chlorine as hereinbefore explained. Moreover, the neutron-gamma ray log 48 will tend to show an increase in counting rate, in such a case, due to the greater number of high energy gamma rays occurring because of the increased number of neutrons captured by the fluid in the lower formation. The reason why the neutron-gamma ray log 48 actually shows a slight decrease in counting rate opposite the lower formation is that, notwithstanding the increase in neutron capture, is because of the moderating effect of the hydrogen in the salt water which acts to reduce the number of neutrons reaching the vicinity of the detector 7 (see FIGURE 1). In other words, most of the neutrons will be captured before they approach the detector 7 near enough for the capture-produced gamma rays to traverse the remaining distance to the detector 7. Such variations in the displacement of the two logs 47 and 48 are frequently encountered in actual well logging, and therefore the interpretation of all well logging measurements is always more useful when performed by persons of experience as well as theoretical training. In addition the particular setting selected for the first and second discriminators 28 and 29 shown in FIGURE 2 will often affect the way in which the two logs 47 and 48 appear. However, if the logs are corelatively obtained and displayed in the manner disclosed and described herein, the various advantages of the present invention will be readily available to those skilled in the art of log interpretation.

Another form of the present invention includes the use of a sodium iodide phosphor 22 for making a "fast neutron" logging measurement. The fast neutrons emanating from the borehole wall 6, when incident on the sodium iodide phosphor 22, produce protons by means of the reactions Na–23, (n, p) Ne–23, and I–127 (n, p) Te–127, and these protons evidence themselves by light pulses as hereinbefore explained. Since the protons have much the greater mass, when compared to the electrons produced by gamma rays resulting from neutron-capture, the proton-initiated scintillations are identified as heretofore described. Of course, fast neutron irradiation will also form radio-nuclides in the phosphor 22. However, the decay gamma radiation emitted by the radio-nuclides are of relatively low energy, and therefore may easily be eliminated by a discriminator of conventional design. It is not essential to coat a sodium iodide phosphor 22 with boron or lithium since measurement of fast neutrons depends upon the aforementioned neutron-proton reactions. However, such a coating 23A may be found useful for "screening" slow neutrons from the detector 7, if a thin metal layer 23B is interposed between the phosphor 22, and the boron (or lithium) to block the alpha particles emitted by the boron. Fast neutron detection apparatus of the type described in the foregoing paragraph is particularly useful as a monitor for neutron radiation supplied by an ion beam accelerator. In such a case, the detector-monitor is preferably located close to the accelerator.

Numerous other variations and modifications may obviously be made without departing from the scope and concept of the present invention. Accordingly, it should be clearly understood that the forms of the invention herein disclosed are illustrative only, and are not intended as limitations thereon.

What is claimed is:

1. Apparatus for investigating the nature of subsurface substances, said apparatus comprising a scintillation means emitting in response to incident radiations functionally related light pulses having decay characteristics functionally related to the character of said incident radiations, means optically connected to said scintillation means and producing a first electrical signal composed of pulses having widths functionally related to said decay characteristics of said light pulses, sorting means receiving said first signal and producing in response thereto a second electrical signal composed of electrical pulses functionally realted to those of said pulses composing said first signal which have widths greater than a pre-determined pulse width, said sorting means simultaneously producing with said second signal a third electrical signal composed of electrical pulses functionally related to those of said pulses composing first signal which have widths less than said pre-determined pulse width, and means for receiving and recording said second and third electrical signals.

2. Apparatus for investigating subsurface substances surrounding a borehole, said apparatus comprising a scintillation phosphor composed of lithium iodide, a photomultiplier tube optically coupled to said phosphor and producing a first electrical signal composed of electrical pulses functionally related to light pulses emitted by said phosphor, a sorting means receiving said first signal and producing in response thereto a second electrical signal composed of electrical pulses functionally related to those first signal pulses having greater than a pre-determined width and a third electrical signal composed of electrical pulses functionally related to those first signal pulses having less than said pre-determined pulse width, and means for receiving and recording said second and third signals corelatively with an indication of borehole depth.

3. Apparatus for investigating the nature of subsurface substances traversed by a borehole, said apparatus comprising a source of fast neutrons, a sodium iodide phosphor spaced a fixed distance from said source, means optically connected to said phosphor and producing in response to radiation-initiated scintillations emitted by said phosphor a first signal composed of electrical pulses functionally related to said scintillations, means receiving said first signal and producing in response thereto a second signal composed of electrical pulses functionally related to those first signal pulses having widths greater than a pre-selected pulse width, and means connected to receive and record said second signal together with an indication of depth.

4. Apparatus for detecting radiation, said apparatus comprising a homogeneous phosphor, means optically connected to said phosphor for producing in response to radiation-initiated scintillations emitted by said phosphor a first signal composed of electrical pulses functionally related to said scintillations, means receiving said first signal and producing in response thereto a second signal composed of electrical pulses functionally related to those first signal pulses having widths greater than a pre-determined pulse width, and means connected to receive said second signal.

5. Apparatus for selectively detecting fast neutrons, said apparatus comprising a sodium-containing phosphor, means optically connected to said phosphor for producing in response to radiation-initiated scintillations emitted by said phosphor a first signal composed of electrical pulses functionally related to said scintillations, means receiving said first signal and producing in response thereto a second signal composed of electrical pulses functionally related to those first signal pulses having widths greater than a pre-determined pulse width, and means connected to receive and measure said second signal.

6. Apparatus as described in claim 5, wherein said phosphor is substantially surrounded by a substance selected from the group consisting of lithium and boron.

7. Apparatus as described in claim 5, wherein said phosphor is substantially surrounded by a coating of metal, and wherein said phophor and coating is substantially surrounded by a substance selected from the group consisting of lithium and boron.

8. Apparatus for investigating the character of subsurface substances traversed by a borehole, said apparatus comprising a source of fast neutrons, a sodium-containing phosphor fixedly spaced from said source and having all except one side covered by an inner coating of a metal and an outer coating of a substance selected from the group consisting of lithium and boron, means optically connected to said one side of said phosphor and producing in response to radiation-initiated scintillations in said phosphor a first signal composed of electrical pulses functionally related to said scintillations, a signal receiving means connected to said first signal and producing in response thereto a second signal and a third signal, said second signal being composed of electrical pulses functionally related to those of said first signal pulses which have widths less than a pre-determined pulse width and said third signal being composed of electrical pulses functionally related to those of said first signal pulses having widths greater than said pre-determined pulse width, and means connected to said signal receiving means to record said second and third signals together with an indication of borehole depth.

9. Apparatus for investigating the character of subsurface substances traversed by a borehole, said apparatus comprising a source of fast neutrons, a sodium-containing phosphor fixedly spaced from said source and having all except one side covered by an inner coating of a metal and an outer coating of a substance selected from the group consisting of lithium and boron, means optically connected to said one side of said phosphor and producing in response to radiation-initiated scintillations in said phosphor a first signal composed of electrical pulses functionally related to said scintillations, a signal receiving means connected to said first signal and producing in response thereto a second signal and a third signal, said second signal being composed of electrical pulses functionally related to those of said first signal pulse which have widths less than a pre-determined pulse width and said third signal being composed of electrical pulses functionally related to those of said first signal pulses having widths greater than a pre-determined pulse width, and means connected to said signal receiving means to record said second and third signals together with an indication of borehole depth.

References Cited by the Examiner
UNITED STATES PATENTS

| 2,648,012 | 8/53 | Scherbatskoy | 250—71.5 |
| 2,862,106 | 11/58 | Scherbatskoy | 250—71.5 |
| 2,883,548 | 4/59 | Baker et al. | 250—71.5 |
| 2,956,165 | 10/60 | Johnson | 250—71.5 X |
| 2,958,780 | 11/60 | Dewan | 250—71.5 X |

RALPH G. NILSON, *Primary Examiner.*

ARTHUR GAUSS, *Examiner.*